UNITED STATES PATENT OFFICE 2,575,581

COATED RUBBER HYDROCHLORIDE FILM

Clarence M. Carson, Silver Lake, Ohio, assignor to Wingfoot Corporation, Akron, Ohio, a corporation of Delaware No Drawing. Application April 20, 1949,
Serial No. 88,679

2 Claims. (Cl. 117—139)

This invention relates to an improved packaging material. More particularly, it relates to rubber hydrochloride film coated with copolymer of vinylidene chloride and acrylonitrile. This coated film is more resistant than the uncoated film to the passage of gases, such as oxygen, nitrogen and carbon dioxide and has other improved properties which will be evident from what follows.

Rubber hydrochloride film is highly resistant to the passage of moisture vapor. However, it is not particularly resistant to the passage of gases such as oxygen, nitrogen, carbon dioxide, etc. For many purposes it is desirable to plasticize rubber hydrochloride film in order to make it tougher and to otherwise change its properties. Usual plasticizers for the film are butyl stearate, dibutyl phthalate, dibutyl sebacate, methoxy-ethyl oleate and other fatty-acid esters. Such plasticizers increase the rate of transmission of gases through the film. The coating of this invention is designed for use on rubber hydrochloride film, plasticized with a fatty-acid ester, the amount of the plasticizer being anywhere from 5 to 25 parts by weight. The thinner the film, the more desirable the coating, although even thicker films may be coated to advantage. The coating may weigh one to five pounds per 3000 square feet.

The coating is prepared by copolymerizing vinylidene chloride and acrylonitrile. Eighty parts of vinylidene chloride to 20 parts of acrylonitrile gives a preferred coating, although from 75 to 85 parts of vinylidene chloride may be used with 25 to 15 parts of acrylonitrile. The copolymer used for the coating may have a viscosity of 40 to 1000 centipoises, although coatings with a viscosity of the order of 1000 centipoises are preferred.

The following table indicates the effect of the coating on films of rubber hydrochloride .0014 inch thick having different plasticizer contents. The weight of the coating is given in pounds per 3000 square feet. The carbon-dioxide diffusions and oxygen diffusions are measured more or less empirically but the relative diffusions are important. The diffusions are expressed in milliliters per one hundred square inches per twenty-four hours.

Gas diffusions through rubber hydrochloride film .0014 inch thick

| Parts Plasticizer | Weight of Coating | Rate of $CO_2$ Diffusion | Rate of $O_2$ Diffusion |
|---|---|---|---|
|  | Pounds | Ml. | Ml. |
| 5 | 0 | 43 | 12 |
| 5 | 3.5 | 4 | ---- |
| 5 | 2.8 | ---- | 4 |
| 11.5 | 0 | 190 | 36 |
| 11.5 | 2.6 | 15 | 3 |
| 11.5 | 3.7 | 13 | ---- |
| 17.5 | 0 | 380 | 75 |
| 17.5 | 3.5 | 88 | 8 |

Various materials have been packaged in the coated film. Several such packages will be described, although the invention is not limited to packaging these materials because it may be used to advantage in packaging coffee, milk powder, egg powder, dried yeast, smoked meat, tobacco, dried fruits and many other products in general use.

The package may, for example, be used for packaging foods, etc. in an inert gas or for vacuum packaging. For example, in the packaging of milk powder in nitrogen, the air is first exhausted from the package and nitrogen is then introduced and the package is sealed. Rubber hydrochloride film, uncoated, is not particularly satisfactory for such a package because of its permeability to nitrogen. However, the coated film of this invention being much more resistant to the passage of nitrogen, maintains the nitrogen for a longer period and keeps the milk powder in better condition.

Tests were made on the vacuum packaging of ground coffee. Ground, freshly roasted coffee gives off carbon dioxide in relatively large volume during the first few hours after grinding.

There is a demand for ground coffee packaged in a vacuum which prevents oxidation of the oils, etc. present in the coffee. To prevent oxidation the coffee must be packaged soon after grinding and while it is still giving off carbon dioxide. If the carbon dioxide diffusion rate of the film used for packaging the coffee is too low, the package will swell and may burst. If it is too high the package will not hold a vacuum and the coffee will lose its flavor. A satisfactory wrapper for vacuum packaging one pound of ground coffee will have a carbon-dioxide diffusion rate of 5 to 12 ml. per one hundred square inches per twenty-four hours. Such a film is prepared by applying 3.5 pounds of preferred copolymer coating to each 3000 square feet of rubber hydrochloride film .0017 inch thick and having a plasticizer content of 10 pounds per one hundred pounds of rubber hydrochloride. Such coated film vents the carbon dioxide satisfactorily and yet resists the passage of gases through the film sufficiently to maintain the coffee in a fresh condition for a satisfactory period.

Another use for the film is found in the packaging of fresh beef, such as steak or roast. It is well known that freshly cut beef becomes brown in color on exposure to the air after 48 hours even under refrigeration. This is due to oxidation of the red hemoglobin. Rubber hydrochloride films of different thicknesses coated with 2 pounds of copolymer coating per 3000 square feet of the film were found to prevent oxidation of the hemoglobin so that beef remained red when stored at 40 to 45 degrees F. for a period of three days up to a week.

Dried fruits, such as prunes, dates, apricots, peaches and apples, etc. usually contain sufficient water to form a sticky or greasy surface on the fruit when mixed with the fruit sugars. When such dried fruits are packaged in uncoated rubber hydrochloride film the sugar-water mixture reacts with the plasticizer in the film forming a cloudy smear on the inner surface of the film and producing an unsightly package. Such dried fruits can be packaged in rubber hydrochloride film coated on the inner surface with copolymer of vinylidene chloride and acrylonitrile without danger of smearing. For this purpose the copolymer coating has been found to be superior to such other coating materials as polyvinyl chloride, chlorinated rubber, cellulose acetate and methyl methacrylate. A very thin coating is satisfactory for this purpose.

It is recognized that rubber hydrochloride film is among the best of the transparent films from the standpoint of resisting penetration of bacteria and mold spores from the surrounding air. The coating of this invention improves the resistance of rubber hydrochloride film to the passage of these minute organisms and even a very thin coating on either surface of the film is satisfactory.

Rubber hydrochloride film is commercially produced by casting a solution of the rubber hydrochloride on a smooth surface and evaporating the solvent. The film produced in this manner contains minute pinholes. Films thinner than .0008 or .001 inch are made by stretching cast films. The pinholes are enlarged by such stretching. When stretched film is used for packaging cheese, butter, lard, oleomargarine or the like, the pinholes allow the contents of the package to pass through sufficiently to make the package greasy on the outer surface. The presence of a coating of vinylidene chloride-acrylonitrile copolymer, whether applied to the inner or outer surface of the film, seals the pinholes and the package is no longer greasy. A very thin coating is satisfactory for this purpose, as regardless of the thickness of the coating the coating material tends to fill the pinholes at least to the thickness of the film. The coated film is less pervious to oxygen and the coated film is therefore more satisfactory than uncoated film for the packaging of such materials because it prevents rancidity from developing.

The present trend in the packaging of sliced bacon is to package it in a vacuum in order to prevent oxidation and the development of rancidity. One wrapper commercially used for such a vacuum package is a laminated sheet of rubber hydrochloride and moisture-proof regenerated cellulose. Such a sheet is sufficiently impervious to the passage of gases to inhibit or prevent the development of mold and rancidity. The copolymer-coated rubber hydrochloride film of this invention has a like effect and may be used in such packages.

In many of the machines used for making bags or pouches for the packaging of foods, drugs, etc. a spool of film is unwound and passed through a series of guide-bars, plates and rollers which fold and heat-seal the folded film to produce a bag or pouch ready for packaging. In producing bags measuring four by five inches or more, utilizing high speeds of, for example, 200 bags per minute, the soft, thin-gauge films cause trouble by folding or buckling. Such difficulty has been experienced with rubber hydrochloride film .001 inch thick. By applying a coating of the copolymer .0001 inch thick, a product is obtained which almost never folds or buckles in such machines.

The coated film of this invention has various other commercial advantages over the uncoated film. It improves the clarity of the rubber hydrochloride film, giving a sheet of a very high degree of transparency. The coating may be applied to either one or both surfaces of the film. If applied to only one surface it will often be advantageous to have the coating on the outer surface so as not to interfere with the heat-sealing of the rubber hydrochloride, although for the packaging of dried fruits the coating is preferably applied to the inner surface of the package. The coating is heat-sealable but loses its tackiness as soon as it is cooled. When applied to the outer surface of a rubber-hydrochloride package it prevents the outer surface from remaining tacky after the package has been heat-sealed and, as a consequence, packages made of rubber hydrochloride film coated on the outer surface with the copolymer may be stacked on one another or placed adjacent to one another immediately after heat-sealing without danger of the packages adhering to one another.

Thus, there are many advantages which result from applying the coating of this invention to rubber hydrochloride film. Although various of these advantages apply to any rubber hydrochloride film, the invention relates only to the films which contain 5 to 25 parts per one hundred of fatty-acid esters as plasticizer because the copolymer has certain unique advantages when applied to such films. The film to which the coating may be applied may be as thin as .0004 inch thick, although ordinarily it will be applied to thicker films, such as films .001 to .002 inch in thickness. The copolymer is soluble in ketones and rubber hydrochloride is not appreciably soluble in these, so the coating of the rubber hydrochloride film involves no technical problems.

References herein to the copolymer coating in which no mention of viscosity is made, refer to copolymer with a viscosity of 40 to 1000 centipoises.

What I claim is:

1. Rubber hydrochloride film .0004 to .002 inch thick containing 5 to 25 parts of fatty acid ester per one hundred parts of rubber hydrochloride as plasticizer, said film being coated with copolymer of 75 to 85 parts vinylidene chloride and 25 to 15 parts of acrylonitrile having a viscosity of 40 to 1000 centipoises, the coating weighing one to five pounds per 3000 square feet and making the film less pervious to oxygen.

2. Rubber hydrochloride film .001 inch thick containing 5 to 25 parts of fatty acid ester per one hundred parts of rubber hydrochloride as plasticizer, and coated with 3 to 3.5 pounds per 3000 square feet of copolymer formed from 80 parts of vinylidene chloride and 20 parts of acrylonitrile having a viscosity of 40 to 1000 centipoises, which coating makes the film less pervious to oxygen.

CLARENCE M. CARSON.

REFERENCES CITED

The following references are of record in the file of this patent:

UNITED STATES PATENTS

| Number | Name | Date |
| --- | --- | --- |
| 2,238,020 | Hanson et al. | Apr. 8, 1941 |
| 2,319,918 | Calvert | May 25, 1943 |
| 2,328,844 | Osterhof | Sept. 7, 1943 |
| 2,334,236 | Arnold et al. | Nov. 16, 1943 |
| 2,393,006 | Vincent | Jan. 15, 1946 |
| 2,474,896 | Hauser | July 5, 1949 |